US010977748B2

(12) United States Patent
Bostick et al.

(10) Patent No.: US 10,977,748 B2
(45) Date of Patent: Apr. 13, 2021

(54) PREDICTIVE ANALYTICS FOR EVENT MAPPING

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 1229 days.

(21) Appl. No.: 14/864,246

(22) Filed: Sep. 24, 2015

(65) Prior Publication Data

US 2017/0091876 A1    Mar. 30, 2017

(51) Int. Cl.
*G06Q 50/00* (2012.01)
*G06Q 30/02* (2012.01)

(52) U.S. Cl.
CPC ......... *G06Q 50/01* (2013.01); *G06Q 30/0201* (2013.01)

(58) Field of Classification Search
CPC ............................ G06Q 50/01; G06Q 30/0201
See application file for complete search history.

(56) References Cited

U.S. PATENT DOCUMENTS

| 6,317,686 | B1 | 11/2001 | Ran |
| 7,774,139 | B1 | 8/2010 | Rose et al. |
| 7,925,676 | B2 | 4/2011 | Hogue et al. |
| 8,525,836 | B1* | 9/2013 | Poursohi ............... H04L 67/10 345/428 |
| 8,553,301 | B2 | 10/2013 | Tamura |
| 9,596,207 | B1* | 3/2017 | Lin ..................... H04L 51/32 |
| 2002/0012461 | A1* | 1/2002 | MacKinnon ............ H04N 1/60 382/164 |
| 2002/0021439 | A1* | 2/2002 | Priestley ................. G01J 3/46 356/243.5 |
| 2004/0130714 | A1* | 7/2004 | Gellerman ............. G01N 21/65 356/300 |

(Continued)

OTHER PUBLICATIONS

Yankee Magazine. Download our Free Foliage App. Aug. 30, 2011. https://newengland.com/today/seasons/fall/leaf-peepr/ (Year: 2011).*

(Continued)

*Primary Examiner* — Robert D Rines
*Assistant Examiner* — Alissa D Karmis
(74) *Attorney, Agent, or Firm* — Stephanie L. Carusillo

(57) ABSTRACT

In an approach to event mapping, one or more computer processors extract, from one or more social networks, data, uploaded by one or more users, corresponding to an event, where the event is nature related. The one or more computer processors extract metadata associated with the data extracted from the one or more social networks. The one or more computer processors determine, based, at least in part, on the data extracted from the one or more social networks and on the extracted metadata associated with the data extracted from the one or more social networks, a current state of the event, where the current state of the event includes at least a condition of the event relative to at least a corresponding condition of a pre-defined optimal state of the event.

14 Claims, 4 Drawing Sheets

(56) References Cited

U.S. PATENT DOCUMENTS

| | | | | |
|---|---|---|---|---|
| 2009/0157312 | A1* | 6/2009 | Black | G01C 21/30 701/414 |
| 2009/0177484 | A1* | 7/2009 | Davis | G06F 16/285 705/346 |
| 2010/0273155 | A1* | 10/2010 | de Boer | C12Q 1/6895 435/6.12 |
| 2011/0238762 | A1* | 9/2011 | Soni | G01C 21/3679 709/206 |
| 2011/0246463 | A1* | 10/2011 | Carson, Jr. | G06F 16/35 707/737 |
| 2012/0206598 | A1* | 8/2012 | Hanafusa | G01W 1/06 348/143 |
| 2012/0271541 | A1* | 10/2012 | Hjelm | G01C 21/3484 701/410 |
| 2013/0103823 | A1 | 4/2013 | DeJana et al. | |
| 2013/0285820 | A1 | 10/2013 | Assuncao et al. | |
| 2013/0307843 | A1 | 11/2013 | Sikka et al. | |
| 2013/0321447 | A1 | 12/2013 | Horovitz et al. | |
| 2015/0032771 | A1* | 1/2015 | Berio | H04L 51/32 707/769 |
| 2017/0039264 | A1* | 2/2017 | Brewington | G06F 16/285 |
| 2017/0180499 | A1* | 6/2017 | Gelfenbeyn | H04L 51/02 |
| 2017/0366488 | A1* | 12/2017 | Pedregal | H04L 51/32 |

OTHER PUBLICATIONS

Lauren Parvizi. Fall foliage map predicts when the leaves will change and where. Sep. 1, 2015. https://www.ctpost.com/travel/article/Fall-foliage-map-predicts-when-the-leaves-will-6479074.php (Year: 2015).*

Susan Kohlback. New Fall Foliage App for Leaf Peeping in New England. Oct. 3, 2011. https://www.wickedgoodtraveltips.com/2011/10/new-fall-foliage-app-for-leaf-peeping-in-new-england/ (Year: 2011).*

Captain, Sean. "Weathernews Wants to Make Everyone Into a Meteorologist" Jul. 27, 2015. https://www.fastcompany.com/ (Year: 2015).*

Parvizi, Lauren. "Fall foliage map predicts when the leaves will change and where." Sep. 1, 2015. https://www.ctpost.com/travel/article/Fall-foliage-map-predicts-when-the-leaves-will-6479074.php (Year: 2015).*

Shiri Wasserman. goFlow: Big Wave Rider Ian Walsh Joins Former Israeli Women's Surf Champ to Launch Global Surfing App. Mar. 31, 2014. https://nocamels.com/2014/03/goflow-former-israeli-womens-surf-champ-and-big-wave-rider-ian-walsh-launch-global-surfing-app/ (Year: 2014).*

L. Xie, H. Sundaram and M. Campbell, "Event Mining in Multi-media Streams," in Proceedings of the IEEE, vol. 96, No. 4, pp. 623-647, Apr. 2008, doi: 10.1109/JPROC.2008.916362. (Year: 2008).*

Brown et al.; "Stormflow Measurement in a Hazardous Environment"; IP.com Prior Art Database Technical Disclosure; IP.com No. 000217157; Electronic Publication: May 4, 2012; 2011, KBR (Kellogg Brown Root, LLC); pp. 1-10.

Ferrell, Jesse; "Social Media: A New Horizon for Forecasting"; Weather Magazine; Jul.-Aug. 2012; pp. 1-5.

IBM; "Adaptive learning numerical weather forecasting model"; IP.com Prior Art Database Technical Disclosure; IP.com No. 000015255; Electronic Publication: Jun. 20, 2003; pp. 1-8.

"Cherry Blossom Festival"; U.S. National Park Service; Printed on: Jun. 12, 2015; pp. 1-6; <http://www.nps.gov/cherry/index.htm>.

"EasyMeasure—Measure with your Camera!"; Caramba App Development; iTunes; Printed on: Jun. 12, 2015; © 2010, Caramba App Development; pp. 1-4; <https://itunes.apple.com/us/app/easymeasure-measure-your-camera!/id349530105?mt=8>.

"Fall Foliage—Resources, Live Web Cams & More"; BlueRidge Country; Printed on: Apr. 10, 2015; pp. 1-3; <http://blueridgecountry.com/travel/fall/fall-foliage-webcams/>.

"Fall Foliage Forecast"; Pocono Mountains Weather; Printed on: Jun. 12, 2015; pp. 1-2; <http://www.800poconos.com/about-poconos/fall-foliage-forecast/>.

"My Favorite App for Shooting Sunrises and Sunsets"; Photofocus; Printed on: Apr. 10, 2015; pp. 1-3; <http://photofocus.com/2013/04/01/my-favorite-app-for-shooting-sunrises-and-sunsets/>.

"New England Foliage Map"; Yankee Foliage; Printed on: Apr. 10, 2015; pp. 1-2; <http://www.yankeefoliage.com/live-fall-foliage-map/>.

"Smart Measure"; Smart Tools Co.; Android Apps on Google Play; May 17, 2015; Printed on: Jun. 12, 2015; pp. 1-5; <https://play.google.com/store/apps/details?id=kr.sira.measure&hl=en>.

"System and Method for Visualization of Service Delivery Network using Weather Maps"; IP.com Prior Art Database Technical Disclosure; IP.com No. 000214718; Electronic Publication: Feb. 3, 2012; pp. 1-3.

"Texas Wildflower and Bluebonnet Sightings Report"; Gary Regner Photography; Wildflower Report; Printed on: Jun. 12, 2015; 11 pages, <http://www.texaswildflowerpictures.com/update.htm>.

"When to Find Peak Color in New England"; Yankee Foliage; Printed on: Jun. 12, 2015; pp. 1-2; <http://www.yankeefoliage.com/peak-foliage-forecast-map/>.

* cited by examiner

US 10,977,748 B2

1

PREDICTIVE ANALYTICS FOR EVENT MAPPING

BACKGROUND OF THE INVENTION

The present invention relates generally to the field of data analytics, and more particularly to using predictive analytics for event mapping.

Predictive analytics is an area of data mining that deals with extracting information from data and using the information to predict trends and behavior patterns. Often the unknown event of interest is in the future, but predictive analytics can be applied to any type of unknown, whether it be in the past, present or future. Predictive analytics encompasses a variety of statistical techniques from modeling, machine learning, and data mining that analyze current and historical facts to make predictions about future, or otherwise unknown, events. The core of predictive analytics relies on capturing relationships between explanatory variables and the predicted variables from past occurrences, and exploiting them to predict the unknown outcome.

According to some figures on employment and expenditures, tourism is the largest industry in the world. Nature-based tourism is any type of tourism that relies on experiences directly related to natural attractions and includes ecotourism, adventure tourism, extractive tourism, wildlife tourism, and nature retreats. Nature-based tourism can include viewing or taking part in annual nature-related events, such as viewing fall foliage and cherry blossoms, picking apples, berries, and pumpkins, and harvesting wild truffles and ginseng. Nature-based tourism can also include taking part in outdoor activities, such as skiing and hiking. Enjoyment of such nature-related events often depends on predicting the best time of year for the event to occur.

SUMMARY

Embodiments of the present invention disclose a method, a computer program product, and a system for event mapping. The method may include one or more computer processors extracting, from one or more social networks, data, uploaded by one or more users, corresponding to an event, where the event is nature related. The one or more computer processors extract metadata associated with the data extracted from the one or more social networks. The one or more computer processors determine, based, at least in part, on the data extracted from the one or more social networks and on the extracted metadata associated with the data extracted from the one or more social networks, a current state of the event, where the current state of the event includes at least a condition of the event relative to at least a corresponding condition of a pre-defined optimal state of the event.

DETAILED DESCRIPTION

Determining the best time to view a nature-related event, such as fall foliage or cherry blossoms, can be difficult. Although many organizations predict a range of preferred viewing times, predictions are often based solely on historical accounts. Variables such as elevation and weather can impact the accuracy of historical-based predictions. Social networks provide real-time data in the form of images and commentary regarding current conditions of a nature-related event. Embodiments of the present invention recognize that a user's enjoyment of a nature-related event can be improved by using predictive analytics to predict an optimal time period for the event by collecting data from social networks, in addition to historical data and weather forecasts. Embodiments of the present invention also recognize that a user's enjoyment of a nature-related event can be improved by providing an optimal route to travel to or through the event. Implementation of embodiments of the invention may take a variety of forms, and exemplary implementation details are discussed subsequently with reference to the Figures.

Figure 1:
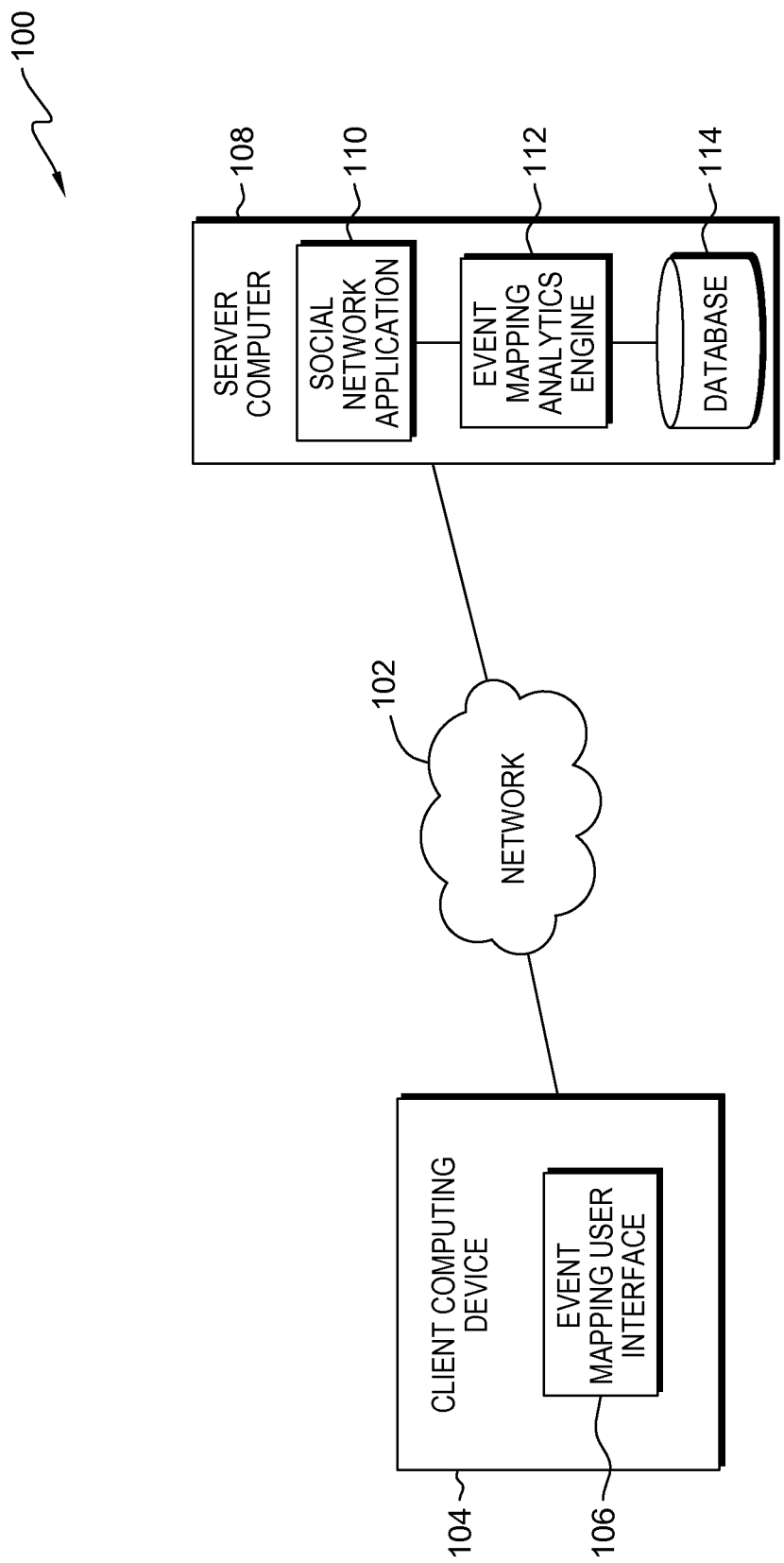
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and server computer 108, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104, server computer 108, and other computing devices (not shown) within distributed data processing environment 100.

Client computing device 104 can be a laptop computer, a tablet computer, a smart phone, or any programmable electronic device capable of communicating with various components and devices within distributed data processing environment 100, via network 102. Client computing device 104 can be a wearable computer. Wearable computers are miniature electronic devices that may be worn by the bearer under, with or on top of clothing, as well as in glasses, hats, or other accessories. Wearable computers are especially useful for applications that require more complex computational support than just hardware coded logics. In general, client computing device 104 represents any programmable electronic device or combination of programmable electronic devices capable of executing machine readable program instructions and communicating with other computing devices (not shown) within distributed data processing environment 100 via a network, such as network 102. Client computing device 104 includes event mapping user interface 106.

Event mapping user interface 106 provides an interface between a user of client computing device 104 and event mapping analytics engine 112 on server computer 108. In an exemplary embodiment, event mapping user interface 106 is mobile application software that provides an interface between a user of client computing device 104 and server computer 108. In another embodiment, event mapping user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. Event mapping user interface 106 enables a user of client computing device 104 to view event prediction that may be plotted on an electronic map, as provided by event mapping analytics engine 112. Event mapping user interface 106 is depicted and described in further detail with respect to FIG. 3.

Server computer 108 can be a standalone computing device, a management server, a web server, a mobile computing device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any programmable electronic device capable of communicating with client computing device 104 and other computing devices (not shown) within distributed data processing environment 100 via network 102. In another embodiment, server computer 108 represents a computing system utilizing clustered computers and components (e.g., database server computers, application server computers, etc.) that act as a single pool of seamless resources when accessed within distributed data processing environment 100. Server computer 108 includes social network application 110, event mapping analytics engine 112, and database 114. Server computer 108 may include internal and external hardware components, as depicted and described in further detail with respect to FIG. 4.

Social network application 110 is one or more of a plurality of platforms for building online social networks among people who share interests, activities, backgrounds, and/or real-life connections. Social network applications are web-based services that allow individuals to create a public or private profile, to create a list of users with whom to share connections, and to view and interact with the connections within the system. Social network applications may also include communication tools such as mobile connectivity, photo and video sharing, and blogging.

In the depicted embodiment, event mapping analytics engine 112 resides on server computer 108. In another embodiment, event mapping analytics engine 112 may reside on client computing device 104. Event mapping analytics engine 112 uses predictive analytics to predict an optimal or peak time period for a nature-related event based on data from social networks in addition to historical data and weather forecasts. Event mapping analytics engine 112 extracts commentary and photos, including associated metadata, from one or more social network applications, such as social network application 110, to determine a current state of an event. The state of an event can be an indication of the conditions, such as closeness to peak for fall foliage or grooming of a ski run. The state of an event can also include whether the event is in the past, present, or future. By combining the extracted social network data with historical accounts of the event in the past and a future weather forecast, event mapping analytics engine 112 can more accurately predict a peak time period than predictions based on historical data alone. Event mapping analytics engine 112 can describe the state of the event, both in the past as well as in the future. In addition, event mapping analytics engine 112 can predict a route for a user to travel which offers a preferred view of the event. Event mapping analytics engine 112 is depicted and described in further detail with respect to FIG. 2.

Database 114 resides on server computer 108. In another embodiment, database 114 can reside elsewhere in distributed data processing environment 100, provided that event mapping analytics engine 112 has access to database 114. A database is an organized collection of data. Database 114 can be implemented with any type of storage device capable of storing data and configuration files that can be accessed and utilized by server computer 108, such as a database server, a hard disk drive, or a flash memory. Database 114 stores historical data relating to an event for which event mapping analytics engine 112 predicts the state. Historical data can include, but is not limited to, dates and times when the event occurred in the past, weather conditions in the time period leading up to the event, and other variables which affected the event in the past.

Figure 2:
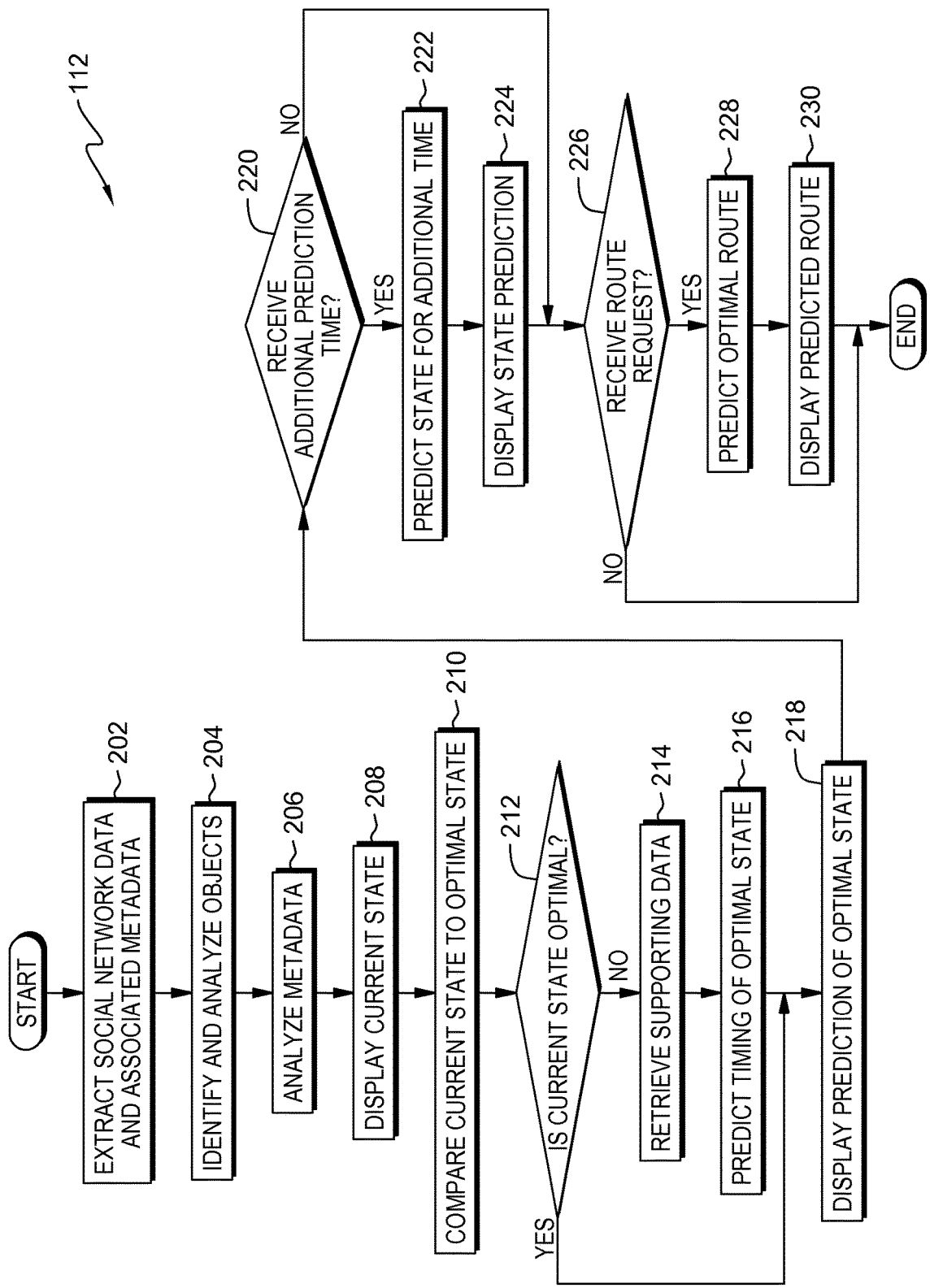
FIG. 2 is a flowchart depicting operational steps of an event mapping analytics engine, on a server computer within the distributed data processing environment of FIG. 1, for predicting event conditions, in accordance with an embodiment of the present invention.

FIG. 2 is a flowchart depicting operational steps of event mapping analytics engine 112, on server computer 108 within distributed data processing environment 100 of FIG. 1, for predicting event conditions, in accordance with an embodiment of the present invention.

Event mapping analytics engine 112 extracts social network data and associated metadata (step 202). In one embodiment, a user, interested in a particular nature-related event, prompts event mapping analytics engine 112, via event mapping user interface 106, to begin predicting the event. In one embodiment, event mapping analytics engine 112 extracts social network data, such as comments and images corresponding to a nature-related event, and associated metadata, such as the date and time the comments were made or the images were captured, in response to a user request, via event mapping user interface 106. In another embodiment, event mapping analytics engine 112 may extract social network data during a time period in advance of an annual, nature-related event, based on historical data for the location of client computing device 104. An annual, nature-related event may be an event that is substantially dependent on the weather. In a further embodiment, event mapping analytics engine 112 may extract social network data in response to a user's calendar entry for an event, whether the event was in the past or is in the future. For example, if the user has a calendar entry from the previous year called "apple picking," then event mapping analytics engine 112 may determine when apple picking season occurs in the current year and extract data based on the date. Event mapping analytics engine 112 searches social network application 110 and extracts one or more images and commentary related to a specific event. Images may include both still photos and video. For example, if the event is viewing of fall foliage, event mapping analytics engine 112 may extract a photo of a tree with yellow leaves. In another example, if the event is the status of ski conditions, event mapping analytics engine 112 may extract a photo of ice on a ski run. Event mapping analytics engine 112 extracts metadata associated with each of the images, for example, the date and time an image was captured, as well as the location of the device with which the image was captured at the time the device captured the image. Location may include such data as latitude, longitude, and/or altitude. The location may be determined, for example, by a global positioning system (GPS) within the device. Commentary can include statements regarding the status of the event. For example, if the event is viewing of fall foliage, event mapping analytics engine 112 may extract a comment from social network application 110 that reads "The colors are so bright today!" In another example, if the event is apple picking at an orchard, event mapping analytics engine 112 may extract a comment from social network application 110 that reads "The red delicious apples are yummy, but the golden delicious aren't ready yet."

Event mapping analytics engine 112 identifies and analyzes objects (step 204). Event mapping analytics engine 112 identifies specific nature objects corresponding to a particular nature-related event, or the subject of the event. In one embodiment, event mapping analytics engine 112 uses known techniques for image matching, such as deep learning algorithms or similarity mechanisms, to identify specific nature objects. For example, the nature related event may be peak fall foliage viewing, and event mapping analytics engine 112 identifies leaves on a tree. In another example, if the event is viewing cherry blossoms, then the objects are cherry trees, or cherry blossoms on cherry trees. In one embodiment, image analytics software is integrated into event mapping analytics engine 112. In another embodiment, event mapping analytics engine 112 uses image analytics software that resides elsewhere in distributed data processing environment 100. By using image analytics, combined with a user's request for event mapping analytics engine 112 to predict a particular nature-related event, event mapping analytics engine 112 extracts image objects corresponding to the event from extracted images and identifies the objects, whether in the foreground or background. For example, using known image analytics methods, if the image is of a person standing in front of a tree, and the event is fall foliage, then event mapping analytics engine 112 can distinguish the person from the tree, and extract the image of the tree or the leaves on the tree. In some embodiments, event mapping analytics engine 112 compares stored or retrieved (e.g., via the Internet) "leaf" or "tree" images to objects identified in an image to distinguish a tree or leaf from a person. Event mapping analytics engine 112 can identify static objects versus moving objects. For a nature-related event, event mapping analytics engine 112 discerns static objects, such as trees, and can analyze the current state or condition of the static objects. For example, event mapping analytics engine 112 can determine a color of an object, such as the leaves or blossoms on a tree. In another example, event mapping analytics engine 112 can determine a distance of an object from the device that captured the image.

Event mapping analytics engine 112 analyzes metadata (step 206). Event mapping analytics engine 112 analyzes the extracted metadata from each image to collect information regarding the status, or state, of the event, i.e., the current conditions of the event with respect to the optimal conditions of the event. The extracted metadata includes a date or timestamp such that event mapping analytics engine 112 can determine whether the social network data is current. For example, event mapping analytics engine 112 may extract images with metadata associated with each image that identifies the location of the image and the date the image was captured. Event mapping analytics engine 112 analyzes the location metadata of a plurality of images that display a similar event status, and determines a widespread area with the same event status, such as ripe apples in multiple apple orchards across the state of New York over one week in September. In another example, event mapping analytics engine 112 may extract multiple images with the same location metadata over a range of dates that indicate the progress of the event over time, such as one cherry tree in various stages of blossoming during a week in April.

Event mapping analytics engine 112 displays current state, or conditions, of the event as compared to optimal conditions of the event (step 208). By analyzing the social network data and metadata, event mapping analytics engine 112 determines the current state of the event. In an exemplary embodiment, event mapping analytics engine 112 displays the current state of the event on client computing device 104 by plotting the results of the analyses of the social network data and metadata on an electronic map via event mapping user interface 106. For example, event mapping analytics engine 112 may use a color code to enhance regions on a map indicating the current state of the event, such as using red to indicate 25 percent of leaves on trees in a particular location are not green and brown to indicate 50 percent of leaves on trees in a particular location are not green. In another example, event mapping analytics engine 112 may outline regions on the map and describe the current state within each outline with text. In another embodiment, event mapping analytics engine 112 may display the current state of the event by listing geographical regions and the associated current state in text on client computing device 104 via event mapping user interface 106. In a further embodiment, event mapping analytics engine 112 may display the current state of the event by providing a text document or an email that includes information on the current state of the event.

Event mapping analytics engine 112 compares the current state to the optimal state (step 210). The optimal state of the event includes a set of pre-defined conditions that describe the peak or most favorable attributes of the event. The optimal state of an event may be defined, for example, using historical statistics corresponding to the event. The optimal state of an event may also be defined, for example, by compiling responses from a survey of users or viewers. In addition, the optimal state of an event may be defined based on a user's past experience. In an embodiment, a subject matter expert defines a baseline optimal state. In another embodiment, a user may define a baseline optimal state, via event mapping user interface 106. For example, a baseline optimal state may be defined for a specific type of event where data is retrieved from a specific database, such as database 114. In another example, a baseline optimal state may be derived from analysis of previous occurrences of the event, such as social network rankings of photos with date, time, and location context used along with known weather conditions, altitude, etc. For example, the optimal state of a fall foliage event may be defined as the time when 85 percent of the leaves on a tree are a color other than green, or one week after 50 percent of the leaves are a color other than green. In another example, the optimal state of ski run conditions may be defined as a base of ten or more inches of snow with no ice on the surface. Event mapping analytics engine 112 compares the current state of the event to the defined optimal state to determine the status of the current state.

Event mapping analytics engine 112 determines whether the current state is the optimal state (decision block 212). Event mapping analytics engine 112 determines whether the current state of the event is equivalent to the pre-defined optimal state. If event mapping analytics engine 112 determines the current state is not the optimal state ("no" branch, decision block 212), then event mapping analytics engine 112 retrieves supporting data (step 214). Supporting data can include, but is not limited to, historical data associated with the event and weather forecasts in the region of the event. Event mapping analytics engine 112 retrieves data from database 114 to use in a prediction of when the optimal state will occur. Event mapping analytics engine 112 retrieves historical data, such as news articles or videos describing the timing of the occurrence of the optimal state. For example, event mapping analytics engine 112 may find data describing a twelve to fourteen day time period to get to peak fall foliage from a state where oak trees are 60 percent yellow. Event mapping analytics engine 112 may also retrieve historical social network data, such as photos and commentary, as described with respect to step 202. Event mapping analytics engine 112 retrieves weather forecasts for the region in which the event occurs. For example, a forecast of colder than normal temperatures can result in fall foliage changing in a shorter period of time than historical data indicates. In another example, a forecast of warmer than normal temperatures can result in ski conditions degrading more quickly than historical data indicates. In one embodiment, a weather forecasting application is integrated into event mapping analytics engine 112. In another embodiment, event mapping analytics engine 112 uses weather forecasting software that resides elsewhere in distributed data processing environment 100.

Event mapping analytics engine 112 predicts timing of optimal state (step 216). Using predictive analytics based on social network data and metadata extracted in step 202 and supporting data retrieved in step 214, event mapping analytics engine 112 predicts the timing of the optimal state of the nature-related event. Event mapping analytics engine 112 can determine the optimal state has already occurred in the past or predict when in the future the optimal state will occur.

Responsive to predicting the timing of the optimal state, or if event mapping analytics engine 112 determines the current state is the optimal state ("yes" branch, decision block 212), then event mapping analytics engine 112 displays the prediction of the optimal state (step 218). The prediction of the timing of the optimal state may be the current time, or it may be a time in the past or in the future. As discussed with respect to step 208, event mapping analytics engine 112 displays the prediction of timing of the optimal state of the event on client computing device 104 by plotting the results of the analyses on an electronic map via event mapping user interface 106. For example, event mapping analytics engine 112 may color code one or more regions of the map by the predicted date or time of the peak of the event and associate a color with a specific time period, as different geographical regions may reach the optimal state at different times. In another example, event mapping analytics engine 112 may display the prediction of the optimal state of the event by listing regions and the associated timing of the optimal state in text on client computing device 104 via event mapping user interface 106. In a further embodiment, event mapping analytics engine 112 may display the current state of the event by marking the user's calendar with comments on the best days to view the event. In yet another embodiment, event mapping analytics engine 112 may display the current state of the event by providing a text document or an email that includes information on the current state of the event.

Event mapping analytics engine 112 determines whether an additional prediction time is received (decision block 220). A user of client computing device 104 may be interested in a prediction of the state of the event during a time that is not the optimal state. For example, event mapping analytics engine 112 may have predicted the optimal state of the fall foliage in a particular region is in three weeks, however a user may be planning a visit to the region in two weeks, and the user wants to know what the conditions will be like during the visit. In another example, if event mapping analytics engine 112 displays, in step 218, that the timing of the optimal state is in the past, the user may want to review the state of the event on one or more past dates to get an idea of when to plan next year's visit. Event mapping analytics engine 112 receives an additional prediction time via event mapping user interface 106. In an exemplary embodiment, event mapping user interface 106 includes a time selection bar with a pointer that can slide across the time selection bar to indicate dates in the past, present, and future. In another embodiment, event mapping user interface 106 may include a dropdown box for the user of client computing device 104 to select or input a desired date. In a further embodiment, event mapping user interface 106 may prompt the user for an additional prediction time.

If event mapping analytics engine 112 determines an additional prediction time is received ("yes" branch, decision block 220), then event mapping analytics engine 112 predicts a state for the additional time (step 222). As discussed with respect to step 216, event mapping analytics engine 112 uses predictive analytics based on social network data and metadata extracted in step 202 and supporting data retrieved in step 214, to predict the state of the event at the additional time requested.

Event mapping analytics engine 112 displays the state prediction (step 224). As discussed with respect to step 208, event mapping analytics engine 112 displays the predicted state, or conditions, of the event at the additional requested time on client computing device 104 by plotting the results of the analyses on an electronic map via event mapping user interface 106, by listing geographical regions and the associated current state in text on client computing device 104 via event mapping user interface 106, or by providing a text document or an email that includes information on the current state of the event. Event mapping analytics engine 112 may also display the current state of the event by marking the user's calendar with comments on the best days to view the event.

Responsive to displaying the state prediction, or if event mapping analytics engine 112 determines an additional prediction time is not received ("no" branch, decision block 220), then event mapping analytics engine 112 determines whether a route request is received (decision block 226). Event mapping analytics engine 112 includes route tracking capability that enables a user to find an optimal route to or through the nature-related event at the time the user plans to attend the event. An optimal route is a route that traverses a region that displays the nature-related event and provides the most favorable, or scenic, view of the event during the time the user plans to attend the event, and corresponding to the pre-defined optimal state of the event. In one embodiment, a user may define preferences for an optimal route via event mapping user interface 106, such as the amount of time allotted for the trip, whether or not to avoid tolls, whether to choose highways or back roads, or the user's preferred mode of transportation, i.e., whether the user plans to drive, bike, or hike. In another embodiment, event mapping analytics engine 112 may take one or more factors into account when predicting an optimal route. For example, event mapping analytics engine 112 can consider all routes within a threshold limit of miles or time, and rank the routes based on the prediction of the optimal state of the event or of the state of the event for an additional time period. In another example, event mapping analytics engine 112 may predict the optimal route based on current or historical traffic conditions. In yet another example, event mapping analytics engine 112 may also predict the optimal route based on the time of day the user is traveling, the weather forecast for the day the user is traveling, etc. Event mapping analytics engine 112 receives a route request via event mapping user interface 106. In one embodiment, event mapping user interface 106 can display a button labelled "plan route" for the user to select. In another embodiment, event mapping user interface 106 may prompt the user for a route request.

If event mapping analytics engine 112 determines a route request is received ("yes" branch, decision block 226), then event mapping analytics engine 112 predicts an optimal route (step 228). If the current state is the optimal state, then event mapping analytics engine 112 uses predictive analytics based on social network data and metadata extracted in step 202 to predict the optimal route. If the current state is not the optimal state, then, as discussed with respect to step 216 and step 222, event mapping analytics engine 112 uses predictive analytics based on social network data and metadata extracted in step 202 and supporting data retrieved in step 214, to predict the optimal route. For example, if the event is viewing fall foliage, a route that travels through a high elevation may be in a different state than a route that travels through low elevations due to differences in climate, weather, plant hardiness zones, and/or tree types. In another example, the conditions of one or more ski runs on an east-facing mountain side may be different than the conditions of one or more ski runs on a west-facing mountain side due to the angle of the sun.

Event mapping analytics engine 112 displays the predicted route (step 230). Event mapping analytics engine 112 displays the predicted optimal route on client computing device 104 by highlighting the optimal route that results from the predictive analytics on an electronic map via event mapping user interface 106. In one embodiment, event mapping user interface 106 highlights the route in response to a request. In another embodiment, event mapping user interface 106 can automatically highlight an optimal route on the displayed electronic map when event mapping analytics engine 112 displays the current state or optimal state of the event on an electronic map. In an embodiment, event mapping analytics engine 112 may display more than one route. For example, if previously determined rankings are equivalent, then event mapping analytics engine 112 displays the equivalent routes. In another example, event mapping analytics engine 112 may display the top three ranked routes, where the routes are ranked based on a criteria such as routes that are historically most traveled or routes with the most positive comments extracted from social networks. In a further example, a user may pre-define the number of route choices displayed via event mapping user interface 106. In another embodiment, event mapping analytics engine 112 may display one or more calculated routes with route attributes. For example, event mapping analytics engine 112 may display one or more routes with associated mileage or travel time. In other embodiments, event mapping analytics engine 112 may display the predicted route by listing directions in text on client computing device 104 via event mapping user interface 106, or by providing a text document or an email that includes a map and/or directions.

Responsive to displaying the route, or if event mapping analytics engine 112 determines a route request is not received ("no" branch, decision block 226), then event mapping analytics engine 112 ends execution.

Figure 3:
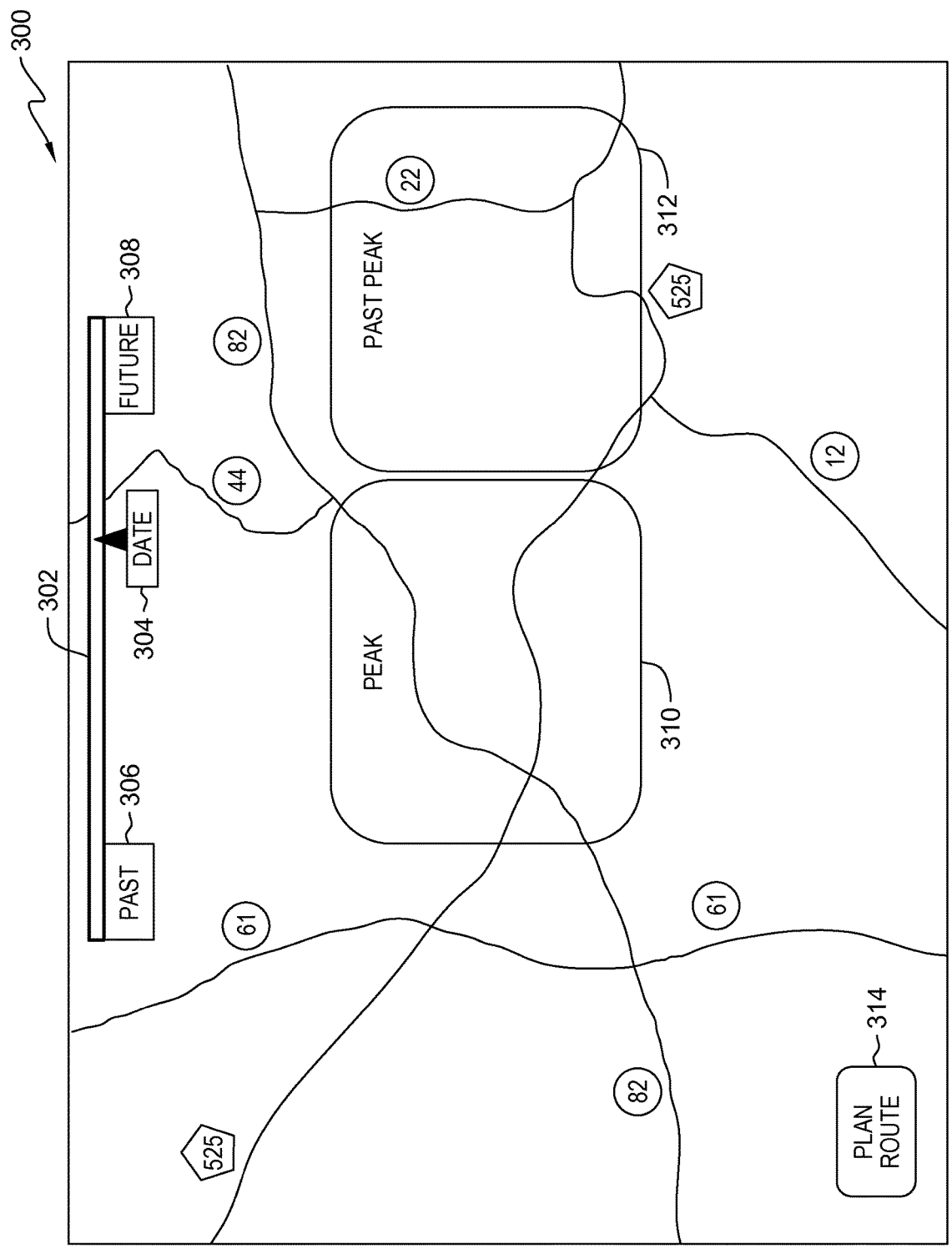
FIG. 3 illustrates an example of an event mapping user interface, on a client computing device within the distributed data processing environment of FIG. 1, in accordance with an embodiment of the present invention.

FIG. 3 illustrates example 300 of event mapping user interface 106, on client computing device 104 within distributed data processing environment 100 of FIG. 1, in accordance with an embodiment of the present invention.

Example 300 is an electronic map as displayed by event mapping analytics engine 112. Included in the display is time selection bar 302 that spans from past 306 to future 308. Pointer 304 indicates the date for which event mapping analytics engine 112 predicts the state of the nature-related event. As discussed with respect to step 224 of FIG. 2, a user can move pointer 304 to the left or right, depending on the time frame of the event the user wants event mapping analytics engine 112 to display. In one embodiment, pointer 304 is interactive, and a user can type a specific date into the date field. In another embodiment, event mapping analytics engine 112 automatically fills the date field as the user moves pointer 304 along time selection bar 302. Example 300 also includes region indicator 310 and region indicator 312. In the example, region indicator 310 outlines a region for which the nature-related event is at peak, or optimal, state, and region indicator 312 outlines a region for which the event is past peak. In the depicted embodiment, event mapping user interface 106 displays region indicator 310 and region indicator 312 with rectangular boundaries. In another embodiment, event mapping user interface 106 may display region indicator 310 and region indicator 312 with color coding. Example 300 also includes plan route button 314. As discussed with respect to decision block 226 of FIG. 2, a user of client computing device 104 can tap, press, or otherwise select plan route button 314 to request, via event mapping user interface 106, that event mapping analytics engine 112 predict an optimal route for viewing the event.

Figure 4:
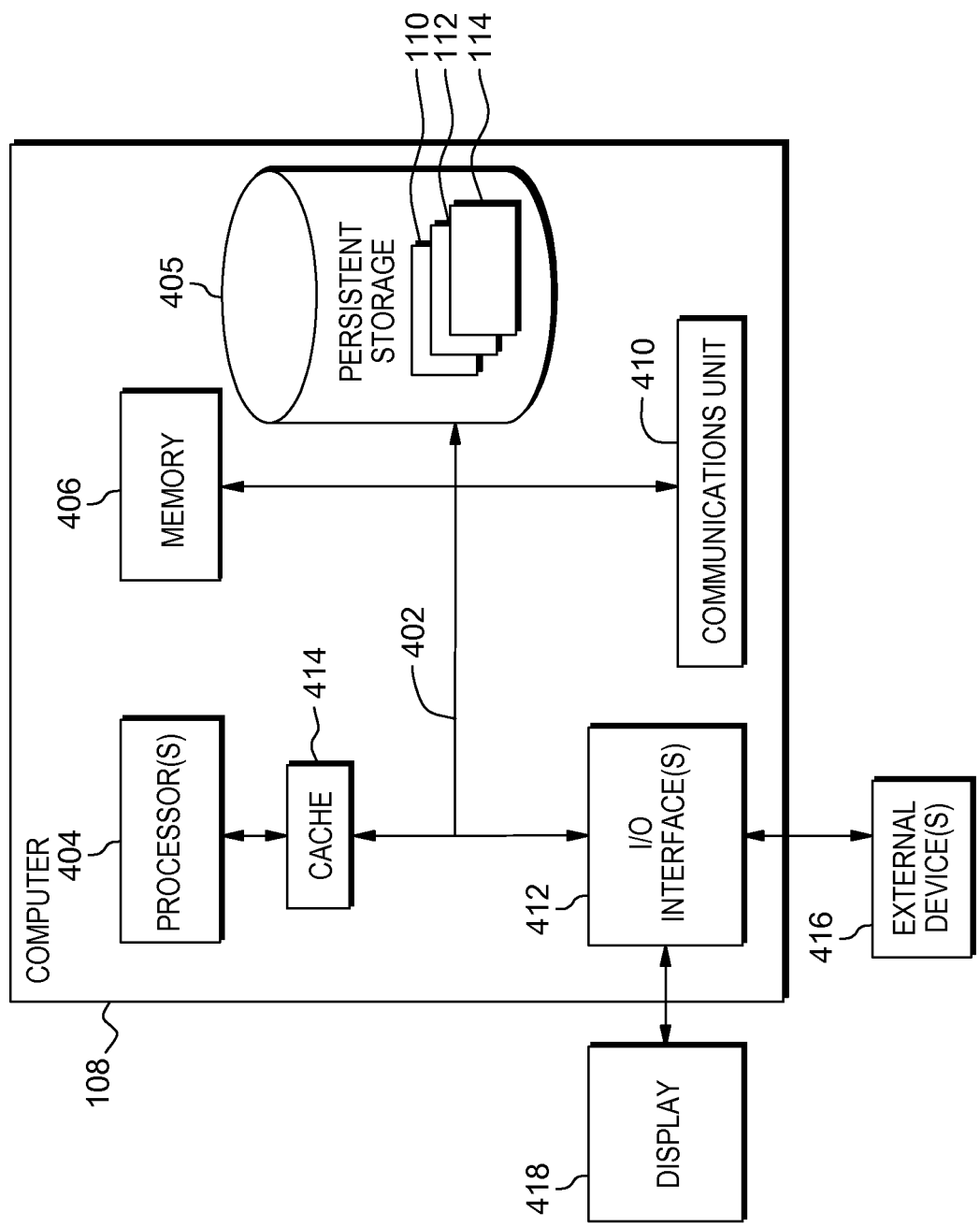
FIG. 4 depicts a block diagram of components of the server computer executing the event mapping analytics engine within the distributed data processing environment of FIG. 1, in accordance with an embodiment of the present invention.

FIG. 4 depicts a block diagram of components of server computer 108 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 108 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., social network application 110, event mapping analytics engine 112, and database 114 are stored in persistent storage 408 for execution and/or access by one or more of the respective processor(s) 404 of server computer 108 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 104. In these examples, communications unit 410 includes one or more network interface cards. Communications unit 410 may provide communications through the use of either or both physical and wireless communications links. Social network application 110, event mapping analytics engine 112, and database 114 may be downloaded to persistent storage 408 of server computer 108 through communications unit 410.

I/O interface(s) 412 allows for input and output of data with other devices that may be connected to server computer 108. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., social network application 110, event mapping analytics engine 112, and database 114 on server computer 108, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for event mapping, the method comprising:
receiving, by one or more computer processors, a calendar entry associated with an event from a calendar of a user, wherein the event is nature related;
based on the received calendar entry, extracting, by the one or more computer processors, from one or more social networks, one or more images and one or more comments corresponding to the event, wherein the one or more social networks are web-based services;
extracting, by the one or more computer processors, metadata associated with the one or more images and metadata associated with the one or more comments extracted from the one or more social networks, wherein the metadata associated with the one or more images includes a date when at least one of the one or more images was captured and a location where at least one of the one or more images was captured;
analyzing, by the one or more computer processors, the one or more images using image analytics software to identify one or more objects in the one or more images;
determining, by the one or more computer processors, based, at least in part, on the analysis of the one or more images and the one or more comments extracted from the one or more social networks and on the extracted metadata associated with the one or more images and the one or more comments extracted from the one or more social networks, a current state of the event, wherein the current state of the event includes at least a condition of the event relative to at least a corresponding condition of a pre-defined optimal state of the event;
plotting, by the one or more computer processors, the current state of the event on an electronic map;
comparing, by the one or more computer processors, the current state of the event to the pre-defined optimal state of the event;
determining, by the one or more computer processors, whether the current state of the event is equivalent to the pre-defined optimal state of the event;
receiving, by the one or more computer processors, a request for a route for the event;
predicting, by the one or more computer processors, two or more routes for the event based, at least in part, on (i) the one or more images and the one or more comments extracted from the one or more social networks and (ii) the extracted metadata associated with the one or more images and the one or more comments extracted from the one or more social networks;
ranking, by the one or more computer processors, the two or more predicted routes, wherein the ranking is based on a quantity of positive comments extracted from the one or more social networks; and
highlighting, by the one or more computer processors, the two or more routes on the electronic map.

2. The method of claim 1, further comprising:
responsive to determining the current state of the event is not equivalent to the pre-defined optimal state of the event, retrieving, by the one or more computer processors, supporting data, wherein the supporting data includes one or more of historical data associated with the event and one or more weather forecasts; and predicting, by the one or more computer processors, a time period corresponding to the pre-defined optimal state of the event based, at least in part, on the one or more images, and on the one or more comments, and on the extracted metadata associated with the one or more images, and on the extracted metadata associated with the one or more comments, and on the supporting data.

3. The method of claim 2, further comprising:

receiving, by the one or more computer processors, an additional time period for the event; and predicting, by the one or more computer processors, the state of the event during the additional time period based, at least in part, on the one or more images, and on the one or more comments, and on the extracted metadata associated with the one or more images, and on the extracted metadata associated with the one or more comments, and on the supporting data.

4. The method of claim 2, further comprising:

responsive to predicting a time period corresponding to the pre-defined optimal state of the event, receiving, by the one or more computer processors, a request for a route for the event; and predicting, by the one or more computer processors, one or more routes for the event based, at least in part, on the one or more images, and on the one or more comments, and on the extracted metadata associated with the one or more images, and on the extracted metadata associated with the one or more comments, and on the supporting data.

5. The method of claim 4, further comprising, responsive to predicting one or more routes for the event, displaying, by the one or more computer processors, the one or more route predictions on an electronic map.

6. The method of claim 1, further comprising:

identifying, by the one or more computer processors, one or more objects in the one or more images extracted from the one or more social networks;

determining, by the one or more computer processors, whether the one or more objects are static; and responsive to determining the one or more objects are static, determining, by the one or more computer processors, a current state of the one or more static objects.

7. A computer program product for event mapping, the computer program product comprising:

one or more computer readable storage device and program instructions stored on the one or more computer readable storage device, the stored program instructions comprising:

program instructions to receive a calendar entry associated with an event from a calendar of a user, wherein the event is nature related;

based on the received calendar entry, program instructions to extract, from one or more social networks, one or more images and one or more comments corresponding to the event, wherein the one or more social networks are web-based services;

program instructions to extract metadata associated with the one or more images and metadata associated with the one or more comments extracted from the one or more social networks, wherein the metadata associated with the one or more images includes a date when at least one of the one or more images was captured and a location where at least one of the one or more images was captured;

program instructions to analyze the one or more images using image analytics software to identify one or more objects in the one or more images;

program instructions to determine, based, at least in part, on the one or more images and the one or more comments extracted from the one or more social networks and on the extracted metadata associated with the one or more images and the one or more comments extracted from the one or more social networks, a current state of the event, wherein the current state of the event includes at least a condition of the event relative to at least a corresponding condition of a pre-defined optimal state of the event;

program instructions to plot the current state of the event on an electronic map;

program instructions to compare the current state of the event to the pre-defined optimal state of the event;

program instructions to determine whether the current state of the event is equivalent to the pre-defined optimal state of the event;

program instructions to receive a request for a route for the event;

program instructions to predict two or more routes for the event based, at least in part, on (i) the one or more images and the one or more comments extracted from the one or more social networks and (ii) the extracted metadata associated with the one or more images and the one or more comments extracted from the one or more social networks;

program instructions to rank the two or more predicted routes, wherein the ranking is based on a quantity of positive comments extracted from the one or more social networks; and program instructions to highlight the two or more routes on the electronic map.

8. The computer program product of claim 7, the stored program instructions further comprising:

responsive to determining the current state of the event is not equivalent to the pre-defined optimal state of the event, program instructions to retrieve supporting data, wherein the supporting data includes one or more of historical data associated with the event and one or more weather forecasts; and program instructions to predict a time period corresponding to the pre-defined optimal state of the event based, at least in part, on the one or more images, and on the one or more comments, and on the extracted metadata associated with the one or more images, and on the extracted metadata associated with the one or more comments, and on the supporting data.

9. The computer program product of claim 8, the stored program instructions further comprising:

responsive to predicting a time period corresponding to the pre-defined optimal state of the event, program instructions to receive a request for a route for the event; and program instructions to predict, one or more routes for the event based, at least in part, on the one or more images, and on the one or more comments, and on the extracted metadata associated with the one or more images, and on the extracted metadata associated with the one or more comments, and on the supporting data.

10. The computer program product of claim 9, the stored program instructions further comprising, responsive to predicting one or more routes for the event, program instructions to display the one or more route predictions on an electronic map.

11. A computer system for event mapping, the computer system comprising:
- one or more computer processors;
- one or more computer readable storage device;
- program instructions stored on the one or more computer readable storage device for execution by at least one of the one or more computer processors, the stored program instructions comprising:
- program instructions to receive a calendar entry associated with an event from a calendar of a user, wherein the event is nature related;
- based on the received calendar entry, program instructions to extract, from one or more social networks, one or more images and one or more comments corresponding to the event, wherein the one or more social networks are web-based services;
- program instructions to extract metadata associated with the one or more images and metadata associated with the one or more comments extracted from the one or more social networks, wherein the metadata associated with the one or more images includes a date when at least one of the one or more images was captured and a location where at least one of the one or more images was captured;
- program instructions to analyze the one or more images using image analytics software to identify one or more objects in the one or more images;
- program instructions to determine, based, at least in part, on the one or more images and the one or more comments extracted from the one or more social networks and on the extracted metadata associated with the one or more images and the one or more comments extracted from the one or more social networks, a current state of the event, wherein the current state of the event includes at least a condition of the event relative to at least a corresponding condition of a pre-defined optimal state of the event;
- program instructions to plot the current state of the event on an electronic map;
- program instructions to compare the current state of the event to the pre-defined optimal state of the event;
- program instructions to determine whether the current state of the event is equivalent to the pre-defined optimal state of the event;
- program instructions to receive a request for a route for the event;
- program instructions to predict two or more routes for the event based, at least in part, on (i) the one or more images and the one or more comments extracted from the one or more social networks and (ii) the extracted metadata associated with the one or more images and the one or more comments extracted from the one or more social networks;
- program instructions to rank the two or more predicted routes, wherein the ranking is based on a quantity of positive comments extracted from the one or more social networks; and
- program instructions to highlight the two or more routes on the electronic map.

12. The computer system of claim 11, the stored program instructions further comprising:
- responsive to determining the current state of the event is not equivalent to the pre-defined optimal state of the event, program instructions to retrieve supporting data, wherein the supporting data includes one or more of historical data associated with the event and one or more weather forecasts; and
- program instructions to predict a time period corresponding to the pre-defined optimal state of the event based, at least in part, on the one or more images, and on the one or more comments, and on the extracted metadata associated with the one or more images, and on the extracted metadata associated with the one or more comments, and on the supporting data.

13. The computer system of claim 12, the stored program instructions further comprising:
- responsive to predicting a time period for the pre-defined optimal state of the event, program instructions to receive a request for a route for the event; and
- program instructions to predict, one or more routes for the event based, at least in part, on the one or more images, and on the one or more comments, and on the extracted metadata associated with the one or more images, and on the extracted metadata associated with the one or more comments, and on the supporting data.

14. The computer system of claim 13, the stored program instructions further comprising, responsive to predicting one or more routes for the event, program instructions to display the one or more route predictions on an electronic map.

* * * * *